United States Patent [19]

Featherston

[11] 3,725,787

[45] Apr. 3, 1973

[54] EXIGENT MULTISATELLITE DIGITAL RADIO COMMUNICATIONS SYSTEM

[75] Inventor: John Richard Featherston, Tucson, Ariz.

[73] Assignee: International Business Machines Corporation, Armonk, N.Y.

[22] Filed: June 30, 1971

[21] Appl. No.: 158,342

[52] U.S. Cl. ..............325/58, 178/69.5 R, 325/52; 325/53; 55; 57; 65; 15, 343/175; 179

[51] Int. Cl. ..............H04b 1/00

[58] Field of Search..........325/4, 5, 7, 10, 13, 15, 16, 325/31, 52, 53, 57, 58, 65, 55; 343/178, 203, 175, 179; 179/15 BS; 178/69.5 R

[56] References Cited

UNITED STATES PATENTS

| | | | |
|---|---|---|---|
| 3,382,485 | 5/1968 | Pettitt | 325/55 |
| 3,631,497 | 12/1971 | Leonard | 325/55 |
| 3,644,883 | 2/1972 | Borman | 325/16 |
| 3,543,161 | 11/1970 | Hatton et al. | 325/67 |
| 3,384,891 | 5/1968 | Anderson | 325/4 |
| 2,740,106 | 3/1956 | Phelps | 325/55 |
| 3,446,949 | 5/1969 | Trimble | 325/65 |

*Primary Examiner*—Albert J. Mayer
*Attorney*—George E. Roush et al.

[57] ABSTRACT

The reliability and efficacy of traffic control in multiple station exigent radio communications is assured by a digital data communication system having accelerated polling and lockout of satellite or circumjacent subordinate station transmitting apparatus when the subordinate stations are contending for the attention of the central or base station and/or a satellite station is located in an area of unfavorable radio wave propagation. Duplex frequency operation with the central station continuously broadcasting messages and/or synchronizing characters, assures synchronization and resynchronization immediately on receipt of a single synchronizing character. Contention is evaluated in the central receiving apparatus by determining the level of optimum signal-to-noise ratio and measuring the r.m.s. value of distortion to establish reception parameters for controlling the mode of the radio net operation. A busy signal is then broadcast for locking out all transmission from the subordinate stations except for that one station accepted. Similarly an indication of field strength is obtained at subordinate station receiving apparatus by a threshold detector arranged to lock out the transmitting apparatus for propagation levels predetermined as unreliable and in a mobile situation to notify the operator to move the station to a better location for communication. Current flow in the second limiter stage of an FM receiver is suggested as a base measurement over a predetermined time period to prevent backlash. Confirmation, acknowledgment, and roll call are controlled by a polling character transmitted at the end of a message. Circuitry responsive to these characters is arranged for conducting an accelerated poll for effecting a single bit response from each circumjacent transmitter addressed specifically in a poll as listed in a predetermined time assignment. For the latter arrangement a shift register used for normal data processing is arranged to double as a counter for this purpose. Changeover delay is obviated by effecting transmission at a predetermined later bit time. Subordinate stations are addressed in general, in groups or as individual stations as best suits the purpose at the central station. Each character comprises identification bits and a control bit. Circuitry responsive to the latter bit is arranged to lock out the transmitter when the central receiving apparatus is busy. Overall capacity of the system is enhanced by interposing message buffer stores for each transmitting and each receiving apparatus.

19 Claims, 4 Drawing Figures

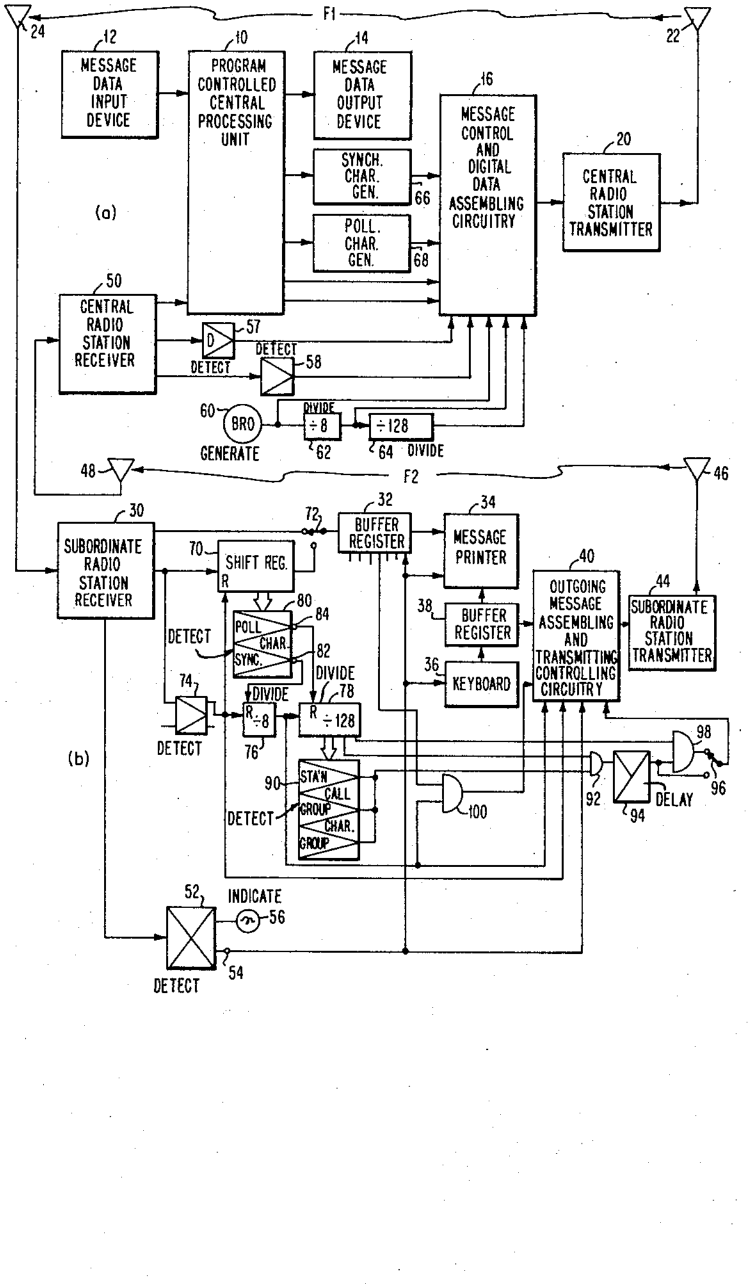
(a)
(b)
F1
F2
MESSAGE DATA INPUT DEVICE
PROGRAM CONTROLLED CENTRAL PROCESSING UNIT
MESSAGE DATA OUTPUT DEVICE
SYNCH. CHAR. GEN.
POLL. CHAR. GEN.
MESSAGE CONTROL AND DIGITAL DATA ASSEMBLING CIRCUITRY
CENTRAL RADIO STATION TRANSMITTER
CENTRAL RADIO STATION RECEIVER
DETECT
BRO
GENERATE
DIVIDE
÷8
÷128
SUBORDINATE RADIO STATION RECEIVER
SHIFT REG.
BUFFER REGISTER
MESSAGE PRINTER
KEYBOARD
OUTGOING MESSAGE ASSEMBLING AND TRANSMITTING CONTROLLING CIRCUITRY
SUBORDINATE RADIO STATION TRANSMITTER
POLL CHAR.
SYNC.
STA'N CALL
GROUP CHAR.
GROUP
DELAY
INDICATE

INVENTOR
JOHN R. FEATHERSTON

BY [signature]
ATTORNEY

EXIGENT MULTISATELLITE DIGITAL RADIO COMMUNICATIONS SYSTEM

The invention relates to digital data modulated radio wave transmission systems and it particularly pertains to duplex systems wherein data is transmitted interactively in two directions between a central radio station having data processing facilities and one or more remote subordinate stations.

Over a period of the last 20 years there has been a growing awareness of the value of effective radio dispatching and communications in the operation of fleets of mobile vehicles. Law enforcement, public utility repair, airline fleets and delivery fleets are examples. The problems have become especially acute in the exigent communications systems; that is, those communications systems transmitting exacting messages demanding immediate aid or action where failure to communicate brings disaster. Such urgent traffic handling systems are used by law enforcement, military, aircraft flight control, and other emergency organizations or agencies.

The systems that have evolved use FM voice transmission in the 30 mc, 150 mc and 450 mc bands. As the number of users and the traffic volume increased, congestion has become severe especially in the larger cities. Many systems have become unable to handle the full volume of message traffic desired with acceptable delay. Additional parallel systems growth is prevented by the critical shortage of radio frequency spectrum space.

Two characteristics of the present systems predominate. The information flow rate is low because human voice operation is used; the effective speed is only about 3 characters per second per voice channel equivalent. The loading of the available channels is inefficient because of uncertainty of transmission and lack of effective control of transmissions; this is especially true of the transmissions from the mobiles in a fleet to the central station (there are from 10 to 100 mobiles in a typical fleet).

The use of high speed machine data transmission in place of voice operation has been proposed. Tests have shown such transmission to be quite practical using a 1,200 baud synchronous data stream with an 8 bit character. The channel capacity can thus be increased but not to the necessary rates of 50 to 150 characters per second.

Effective traffic control centers about the necessity of using data channels of varying quality and reliability. As is well known, the absorption or blocking of the propagation path by trees, buildings or other objects can cause areas of mobile operation producing very high propagation loss between stations. Standing wave interference effects due to multiple path propagation also have an effect of high apparent path signal distortion.

It is possible to reduce these effects by use of multiple transmitters at central or special antenna placement, but it is well known that it is practically impossible to propagate a useful signal to all geographical locations to which the mobiles have access.

In most conventional mobile radio systems, a single base transmitter transmits to receivers in a large of cars in which a large number of transmitters may require a share of the time of a single base receiver. This creates a severe system organizational problem to control efficient traffic flow. The severest problem lies in the control of the mobile to base traffic flow. Open contention schemes are simple and very efficient on light loadings but fail through pile-up of multiple mobile transmissions. Polling schemes do not pile up but are otherwise very inefficient.

The state of the prior art with respect to these problems is reflected in the following U.S. Pats:

| | | | |
|---|---|---|---|
| 2,176,868 | 10/1939 | Boswau | 250-6 |
| 2,521,721 | 9/1950 | Hoffman | 250-9 |
| 2,531,433 | 11/1950 | Hoffman et al. | 250-9 |
| 2,616,080 | 10/1952 | Homrighous | 343-204 |
| 2,649,540 | 8/1953 | Homrighous | 250-6 |
| 2,731,622 | 1/1956 | Doremus et al. | 340-163 |
| 2,932,729 | 4/1960 | Yamato et al. | 250-6 |
| 2,987,615 | 6/1961 | Dimmer | 250-6 |
| 3,141,928 | 7/1964 | Davey et al. | 178-50 |
| 3,358,233 | 12/1967 | Reindl | 325-55 |
| 3,418,579 | 12/1968 | Hultberg | 325-52 |
| 3,479,462 | 11/1969 | Yamato et al. | 179-15 |
| 3,485,953 | 12/1969 | Norberg | 179-15 |
| 3,529,243 | 9/1970 | Reindl | 325-55 |

and in the technical literature: J. R. Featherston, "Adaptive Order Wire System," IBM Technical Disclosure Bulletin, Vol. 8, No. 12, May 1966, pp. 1769–70.

These prior art arrangements for the most part are directed to radio communications systems of the type formerly known as satellite radio systems; that is, systems having a central or base station and a plurality of satellite or circumjacent subordinate stations dependent on the central station for at least one element of control. Some of the older systems are asynchronous, while the later systems are synchronous. Mainly these prior art systems require oscillators at each circumjacent station and the oscillators are brought into synchronism as required by rather complex means consuming message time to an undesirable extent. Some deal with net control having features bearing on the invention, but most of the systems have a polling arrangement of the successive response-on-interogation type wherein considerable message time is consumed in blocking and unblocking station apparatus to a highly undesirable extent. Other of these arrangements poll and synchronize in a start-stop manner. Obviously, these systems consume much more message time than is desired.

According to the invention the objects hereinbefore referred to indirectly and those that will appear as the specification progresses are attained in a digital two-way radio communication system having control at the central or base station over the flow of traffic in both directions. Systems of the particular type herein disclosed have long been known to those skilled in the art as "satellite radio systems" because the subordinate stations are located or operable only in a spherical area circumjacent the central or base station and are dependent on that central station for at least one element of control or intelligence interchanged.

The advent of artificial earth satellites and the attendent radio and radar systems has introduced a different meaning to the term. Because "satellite" radio and radar systems are only analogous in connotation and artificial satellite radio and radar systems are real, the terminology will be avoided hereinafter except when applied as an explanatory term. Therefore, as used herein, the term "circumjacent" is to be construed as the full equivalent to the term "satellite" as used in the prior art as defined above. The traffic flow in the two directions is essentially independent but interactive in the sense that the message in one direction and the confirmation which results flows in the opposite direction.

One dual frequency communications channel is time shared between several functions. The arrangement time divides the central station transmitter between central to mobile traffic and the function of mobile to central-control.

A preamble of synchronizing information is provided in transmission from the central station before a satellite circumjacent station can transmit traffic at least in the general data synchronous sense. The loss in efficacy due to this preamble which usually consists of an interval for bit element synchronization followed by a character synchronization pattern is dependent on how often it is necessary to re-establish synchronization. The loss may be very high with frequent short messages on new paths.

Data transmission from the central radio transmitter is continuous. This avoids any need to reestablish synchronization except when reception resumes after a propagation failure or after a loss of signal from central due to the normal operation of the local satellite transmitter which blocks the companion receiver.

When the receiver at a subordinate station (especially a mobile station) resumes under these conditions the data appears as continuous isochronous data from the central station transmitter (as there always is) but it pulls into complete synchronization on the next message start character. This is then in time for the first message usable in any event.

Failure of the central station signal to communicate with a subordinate station is not common as the central-to-subordinate path is the better of the two. Failure due to a another subordinate station transmitting at the same time is prevented by locking out the transmitter of any subordinate station with traffic if at the moment the subordinate station receiver is taking traffic for that station.

Some of the synchronous functioning which requires the preamble is transferred to the data stream moving in the other direction. The character frame structure is radiated by the central station in some cases. If messages of only a small information content are required in the opposite direction (subordinate to central) they are coded in reference to this central broadcast structure. A prime example of the usefulness of this approach comes in the case of required confirmation from each of many mobile stations to a message broadcast to all stations. When the central broadcast message is completed, the stage is set for the worst case pile-up on the mobile-to-central channel as all units active contend for capacity for their acknowledgment.

According to the invention polling efficiency is improved by arranging an automatic poll of sequential addresses of active cars broadcast by the central station at the conclusion of any message requiring confirmation. This requires one character per car (for example seven bits of binary identity plus one bit reserved for traffic control). This takes one one-hundred fiftieth second at 1,200 baud or 6.6 milliseconds/car. An address recognition register in each car is arranged to respond to the assigned call identity and will output a pulse at the end of that character. This pulse is used to initiate a 5 millisecond carrier burst, from the subordinate transmitter. The burst is characterized by a simple modulation waveform which can readily distinguish it from a steady interfering transmission. For example, a simple 3.3 millisecond shift in frequency initiated by the character address recognition, is provided at the mid-character of the next character time thus providing a unidirectional pulse out of the central station receiver discriminator in the middle of the address following that of each car confirming the subject broadcast. No probable combinations of other operations would be likely to generate such a pulse falsely.

Further according to the invention, control of the subordinate-to-central station traffic is accomplished in part by the emission by central of an indicator of the status of the mobile-to-central-channel which is otherwise unknown to the subordinate stations as mentioned above. This is accomplished by dedicating a periodic bit in the data stream from the central station transmitter to the indication of the mobile-to-central status which is derived from information available at the central station from operation of the central receiver. This periodic bit preferably is one bit per character (once every 6.6 milliseconds) or alternately at some sub-multiple of this rate. An attractive approach is to expand the indication to several bits sent alternatively (as part of odd and even characters in the case of two bits, for example). This ability is another advantage derived from the initial system feature of continuous central station transmission.

As a consequence of the operation of multiple circumjacent stations as described, there is a finite possibility of two or more remote stations contending for the subordinate-to-central channel in the singular time relation which prevents any from being successful in transmission to the central station. In other words, the disclosed system is generally efficient but has the remote possibility of a pile-up. As this event is serious, the system recovers in an automatic way from such pile-ups on the rare occasion that they do occur. The central station is arranged to recognize the fact that a pile-up (being called by two or more subordinate stations) has occurred. In the disclosed system, this is accomplished by a signal analysis device at the central station receiver. The basis of this device is to detect the difference in data structure between transmission from a single subordinate (including one of marginal quality) and transmission from a multiple of subordinate stations. The desired differentiation is made by reference to two parameters available in the central station receiver. One of these is a parameter related to the quality of the received signal in the case of a single signal ability to produce useful data output.

One convenient parameter which has this first relation is the second limiter current of the central receiver. This measure of received signal amplitude is used to separate the following two situations:

Either

1. Reception of a transmission of such strength that if it is a single station it should produce low data distortion output;

Or 2. Reception of a transmission of such low strength that even if it is a single station (no other interference) it will probably produce a data output with considerable distortion.

Another of the parameters is a measure of the telegraphic distortion in the data produced by the demodulator at the central station receiver. This parameter (data distortion) is evaluated as being high or low of a predetermined threshold with the following significance:

Either 1. The distortion is so low that correct data recovery is assured;

Or

2. The distortion is so high that correct data recovery is unlikely.

In order that full advantage of the invention may be obtained in practice, preferred embodiments thereof, given by way of example only, are described in detail hereinafter with reference to the accompanying drawing, forming a part of the specification, and in which:

FIG. 1 —sections (*a*) and (*b*) being taken together— is a functional diagram of a two-way radio wave digital data communications system according to the invention;

Figure 1:
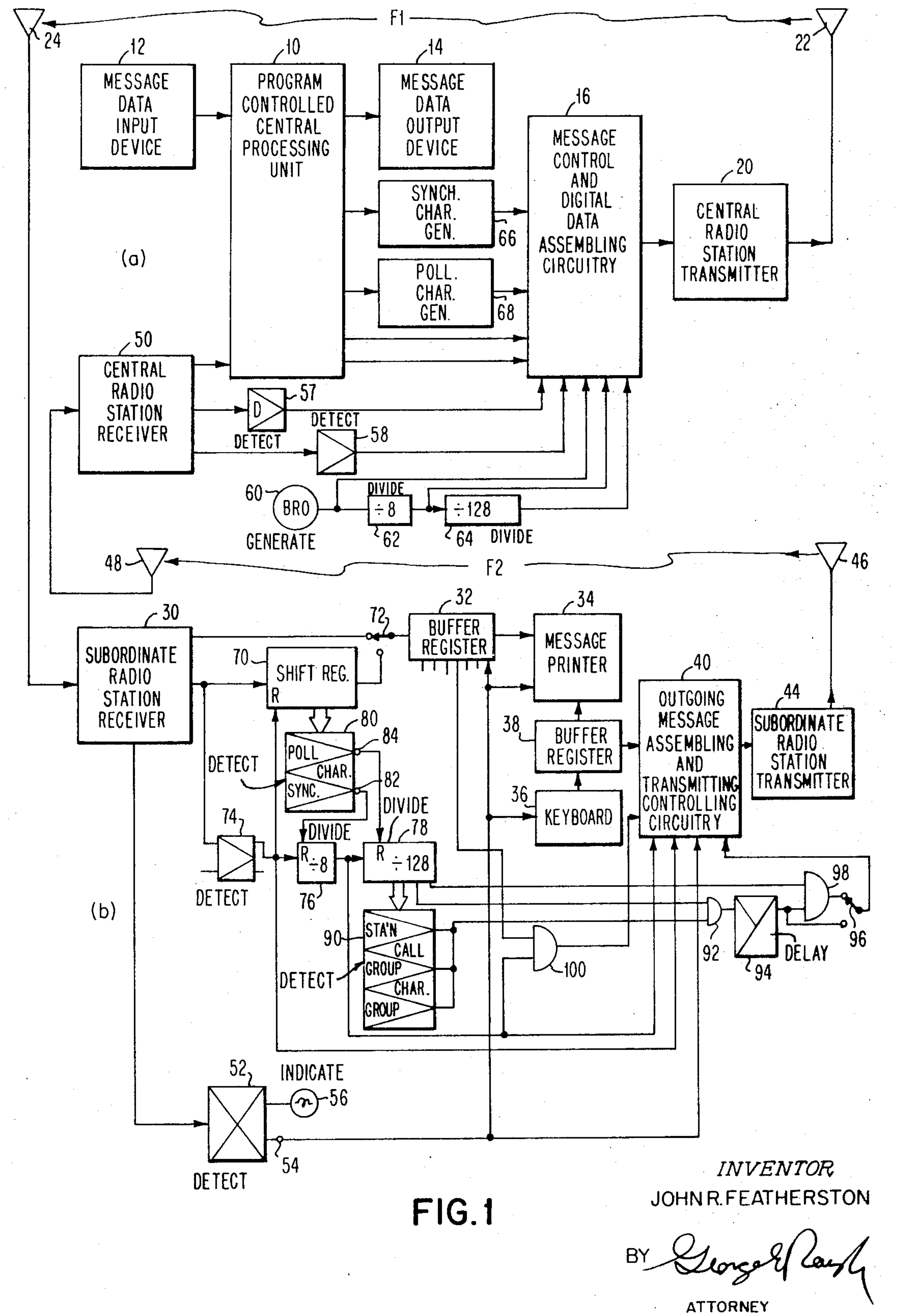

The essential apparatus for performing the functions of a radio system according to the invention is illustrated in the functional diagram of FIG. 1, sections (*a*) and (*b*) being taken together. Parts of the system depicted are common to prior art radio systems arranged for operation in conjunction with a data processing system shared with other operations at the particular installation. A commercially available computing or data processing system having a program-controlled central processing unit 10 has a message data input device 12 and a message data output device 14. In what may be the simplest form of such a system, the input device 12 and the output device 14 may comprise unitary electronically controlled input/output typewriter of one of several types commercially available for data processing systems for over a decade. It should be understood that the central processing unit 10 is frequently connected to input/output units, file and storage devices, and the like and/or is capable of being connected internally to function as such. Under program control of the central processing unit 10, message control circuitry 16 is arranged to handle intelligence for modulating a fixed central radio station transmitter 20. Radio waves modulated about a carrier frequency $F_1$ are radiated by an antenna system 22. While the invention is applicable in general to many types of radio communication, it will be described in a frequency modulation system since that type is the most commonly used today. This modulated radio frequency energy is intercepted by a receiving antenna 24 coupled to a receiver 30 of a subordinate radio station. The latter radio station may be fixed in location or mobile. The invention is applicable to either, but it is especially cognizant of problems with mobile multiple circumjacent stations. Messages are applied to a buffer register 32 and printed out on a message printer 34. Preferably this same message printer 34 is used to print out any message to be transmitted by the subordinate radio station to the central station as assembled by operation of a keyboard 36 and a buffer register 38. The message typed on the keyboard 36 is stored in the register 38 and thereafter translated serially to outgoing message assembling circuitry 40. Thereafter the message is transferred to a radio station transmitter 44 which radiates a wave modulated about a different carrier frequency $F_2$.

The intelligence modulated radio wave of frequency $F_2$ from the subordinate station is picked up by a receiving antenna at the central radio station where it is connected to a central station receiving apparatus 50. The output of the receiver is applied to the central processing unit 10 for processing as required for the application at hand. As thus far described the arrangement is conventional and the apparatus as broadly described will be found in the art or arranged by those skilled in the art for the particular application. According to the invention, transmission from the subordinate radio station will take place only if the radio wave propagation between that station and the central station is favorable. A detector in the form of threshold type level flipping reciproconductive 52, for example a Schmitt triggering circuit is coupled to the mobile station receiver 30 at a portion thereof indicative of received signal strength, such as the automatic gain control circuit.

Because of the gross inconsistency with which the terminology relating to the many types of "multivibrators" and similar circuits is used, the less frequently but much more consistently used term "reciproconductive circuit" will be used hereinafter in the interest of clarity. As employed herein, the term "reciproconductive circuit" is construed to include all dual current flow path element (including vacuum tubes, transistors and other current flow controlling devices) regenerative circuit arrangements in which current flow alternates in one and then the other of those elements in response to applied triggering pulses. The term "free running multivibrator" is sometimes applied to the "astable reciproconductive circuit" which is one in which conduction continuously alternates between the elements after the application of a single triggering pulse (which may be merely a single electric impulse resulting from closing a switch for energizing the circuit). Such a circuit oscillates continuously at a rate dependent on the time constants of various components of the circuit arrangement and/or the applied energizing voltage. The term "monostable reciproconductive circuit" will be used to indicate such a circuit as the time delay circuit 52 in which a single trigger is applied to a single input terminal to trigger the reciproconductive circuit to the unstable state once and return. This monostable version is sometimes called a "single-shot circuit" in the vernacular principally because of the erosion of the original term "flip-flop" and because it is shorter than the term "self-restoring flip-flop circuit" later used in an attempt to more clearly distinguish from the term "bistable flip-flop circuit" even more lately in vogue. "Bistable reciproconductive circuits" are divided into two basic circuits. One is the "bistable reciproconductive circuit" having two two input terminals between which successive triggers must be alternately applied to switch from one stable state to the other, will be referred to as a "bilateral reciproconductive circuit." This version is loosely called both a "flip-flop" and a "lockover circuit." The other is the "binary reciproconductive circuit" which has one input terminal to which triggering pulses are applied to alternate the state of conduction each time a pulse is applied. Another reciproconductive circuit is one of several types frequently rather loosely referred to in the vernacular as a "Schmitt trigger." It differs from the previously mentioned circuits in that it responds primarily to changes in level and restores to the initial state when the reciprocating level drops. This type of circuit will be referred to as a "level triggering reciproconductive circuit" or as a "level-triggering circuit." Such level triggering circuits are excellent for resolving the evaluation of signals in binary fashion. When the signal level is sufficient to be recognized the level triggering flip-flop will switch to a state so indicating. These circuits exhibit an "hysteresis characteristic" which is an advantage in more clearly distinguishing signals having intermediate values that reflect marginal operation; only the signal definitely desired for operation will switch the circuit designed for the applications and hold it until the signal level has dropped well below the triggering level.

An output terminal 54 of the monostable reciproconductive circuit 52 is up when the conditions are favorable and this output is applied as a control signal to the transmitter controlling circuitry 40. Simple conventional circuit components are arranged therein for enabling the subordinate radio station transmitter 40. The favorable propagation output of the reciproconductive circuit 52 may also be applied to the message buffer 32 and/or of the printer 34 for permitting operation of the printer only on favorable propagation, however, in many applications a printout of whatever is in the buffer will be permitted in the interest of the exigency.

At the fixed central radio station receiver 50, the output of the central station receiving apparatus 50 is applied to a detector 57 which may be entirely conventional for determining the distortion in the signal. Another detector 58 is connected to the fixed central radio station receiver 50 for determining strength of the received signal. These two detectors 57 and 58 are coupled to the controlling circuitry 16. Circuitry of conventional components is arranged in the message control circuitry 16 for determining the efficacy of reception and the corresponding control of the traffic from the subordinate station, including a determination, of course, that the receiver 50 is busy and the interposition of a signal in the modulated radio wave to prevent other stations from transmitting in order to eliminate interference from their radiated carrier wave modulation.

The system according to the invention maintains substantially complete synchronization of all operative stations with the central radio station. A baud or bit rate clock-generating oscillator circuit 60 under control of the central processing unit 10 is connected to the central circuitry 16 along with character rate signals from a character counting circuit 62. The output of the dividing circuit 62 is applied to another counting circuit 64. The latter is coupled to the message control circuitry 16 and is utilized for assembling the various messages to be transmitted for controlling operation at the subordinate mobile radio station. Much of the described apparatus is conventional and will be discussed with appropriate parts hereinafter. That apparatus discussed which is not conventional will be discussed in such detail hereinafter as to enable those skilled in the art to practice the invention. A pair of character signal generators 66 and 68 complete the central station arrangement. The generator 66 is a synchronizing character generator and the other generator an operational character generator of which there may be several. The generator 68 is shown as a polling character generator operating as described hereinafter. The generators 66, 68 and the message control and digital data assembling circuitry each and all may be stored and manipulated in the program controlled CPU 10 as is well known in the art. Information bearing matrix (IBM) cards and a card reader and/or hand wired circuitry are equivalent structures for these components.

At the subordinate radio station the data is shifted into a shift register 70. The data can be applied to the buffer register 32 from the shift register 70 in an alternate position of a switch 72 instead of directly as shown, an arrangement which will be described hereinafter. A transition detector and pulse generating circuit 74 is coupled to the receiver 30 and arranged to deliver pulses to the shift register 70 for shifting the latter, to the outgoing message assembling and transmitter controlling circuitry 40, and to a counting circuit 76.

The transition detector and pulse generator 74 also comprises conventional means of continuing the production of element rate output pulses even during brief intervals during which there is no received data signal as during a transmission by subordinate transmitter 44 or a brief fading of the received signal. This is readily done by conventional means as for instance by using the received transitions to phase control a synchronous oscillator, for example an astable reciproconductive circuit, whose free running frequency stability is good enough that bit or character alignment will not be lost over a void in synchronizing pulse lasting several minutes.

The counting circuit 76 is arranged to count to the predetermined number of baudels or bits of all characters in the data train. The most common character length for conventional systems is eight bits or baudels. The latter term is used in wire and radio telegraphy, while the former is more often used in data processing. The counting circuit 76 is extended in essence by another counting circuit 78 although they are reset separately. The character counting circuit 76 is reset by one output of a character detecting circuit 80 while the other counting circuit 78 is reset by another output of the detector circuit 80. The detector circuit 80 is coupled to the shift register 70. Convention character detecting circuitry such as a pair of multiple AND gating circuits wired in prearranged manner corresponding to the character to be detected produce a pulse on coincidence. Thus when the synchronizing character is in the shift register 70 a pulse is produced at terminals 82 which is connected to the reset terminals of the character counting circuit 76. In this manner the system is brought into and maintained bit and character synchronism. The output of the character counting circuit 76 is delivered to the outgoing message assembly and transmitter controlling circuitry 40 at character transition time. A similar arrangement, which may have circuitry in common with the synchronizing character detector, is arranged to deliver a reset pulse at terminals 84. This pulse is then delivered to the other character counter 78. The counting circuit 78 doubles as a counting circuit and as a data register. In the latter function data is detected by an address detector 90 in the same manner as the combination of the register 70 and the detector 80. Here, for example, the address of the local station, the STation call of a mobile, radio equipped police car, or a GRoup of stations operating together, or a General Call for all satellite stations to answer are detected. The detector circuit 90 may be of any conventional form, such as paired multiple AND gating circuits and the equivalent. Preferably the circuit 90 is made of separate plug-in modules for the Station and GRoup Calls. It is contemplated that a duty rack of modules and circuitry is provided at the central station and carried to the central circuitry 16 and the CPU 10 to list the idle calls. When a mobile STation car is dispatched the STation and GRoup call modules are removed from the rack—which information is automatically conveyed to the CPU 10. The modules are then plugged in the station apparatus and the identification numbers of the car and the occupants entered into the system by the dispatcher.

The output of the detector circuit 90 is connected to a dual input AND gating circuit 92. The other input of this circuit is connected to the counting circuit 78 at a stage corresponding to the STation call; this connection preferably is a part of the plug-in arrangement. On recognition of one of the calls, the subordinate station is able to transmit a burst of radio frequency energy in reply. Conventional circuitry for assembling and gating this burst is a part of the controlling circuitry 40. In order to prevent interference at the subordinate station the reply is delayed by a conventional circuit shown here as a monostable reciproconductive circuit 94. The latter circuit is arranged to delay the control for a period of time of a few counts. This delayed pulse is delivered through a switch 96 to the central circuitry 40. A more positive arrangement is provided by another AND gating circuit 98 connected to deliver the pulse at the later count as delivered from the counting circuit 78; the connection is also a part of the STation call plug-in module. Another AND gating circuit 100 completes the station. This circuit is arranged to detect the presence of a predetermined bit of each character as it appears at character time in the buffer register 32. The presence of a bit of one nature, say a binary unit (1), is passed to the control unit 40 to comply with an instruction from the central station that the latter is "-busy" with another station and no transmission is to be made by the calling station. Preferably, a further AND gating circuit (not shown) is wired to the same stages to indicate a binary naught (0) for more positive control.

For mobile circumjacent radio stations dispatched from a central location there are conventional systems designed around data transmission channels capable of supporting typically 1,200 baud to and from mobile stations up to approximately 95 percent of the area the mobile units may occupy. If a mobile unit moves into an area of unsatisfactory propagation from the central station, the unit effectively loses contact with the central station and any messages from the central station will probably be lost. This results in additional messages from both the mobile and central stations once the loss has been noticed thus lowering the network efficiency. A propagation failure alarm system according to the invention serves to minimize the time mobile units spend in such unsatisfactory areas and virtually eliminates the waste and interference caused by attempted transmissions from such areas.

Essentially a circuit is arranged to monitor the continuous transmission from the central station and lights a warning lamp on the mobile station control console advising the operator that the unit is located in an area of poor radio operation. Since the central radio station transmits continuously for a number of purposes detailed elsewhere, the received signal can be evaluated with respect to the capacity of that signal to convey data as received by the mobile station receiver.

The signal quality is evaluated on the basis of:

a. the second limiter current of an FM receiver; or b. the level of the synchronous bit clock extracted from the data signal; or c. the telegraphic distortion present in the post detection data signal; or d. the message error rate derived from an error detection circuit.

These measures are all usable and are arranged in order of increasing discrimination and complexity of implementation. Conventional means are available in each case. As shown in FIG. 1(*b*) a threshold detector, in the form of a level triggering reciproconductive circuit 52 or "Schmitt trigger" is arranged to reciprocate the circuit 52 whenever the evaluating level falls below a required minimum level.

An integrating time constant of several seconds is useful in the threshold triggering operation as is a significant degree of hysteresis to prevent random distracting operation of the alarm under temporary minor signal fluctuations in good areas. The detector circuit 52 in turn, activates an alarm lamp 56 warning the operator of the condition of probably being out of communication with the central station. Note that this occurs even though the central station, at that moment, may not be trying to communicate with the mobile station in question. Thus a corrective relocation may take place before a message is actually lost.

The same high correlation between the quality of the central-to-mobile and the mobile-to-central propagation paths is applied to prevent the loss due to poor propagation of any of the mobile stations transmissions to the central station by interlocking the mobile station transmitter so as to prevent transmission when the unit is located in an area of bad reception of transmission from the central station. This will not prevent any significant transmission from a mobile unit which would have been successful as the central-to-mobile radiation is usually significantly better because the central station transmitter power is conventionally about 10 db higher than is the mobile unit transmitter; the receivers at each station are about equal in performance. In In other words, if the location is such that the central-to-mobile path is questionable the mobile-to-central path should not be attempted as the probability of the mobile unit causing interference to other mobile units is a greater risk than the slim chance of getting a message through on an attempted mobile-to-central station transmission.

Figure 2:
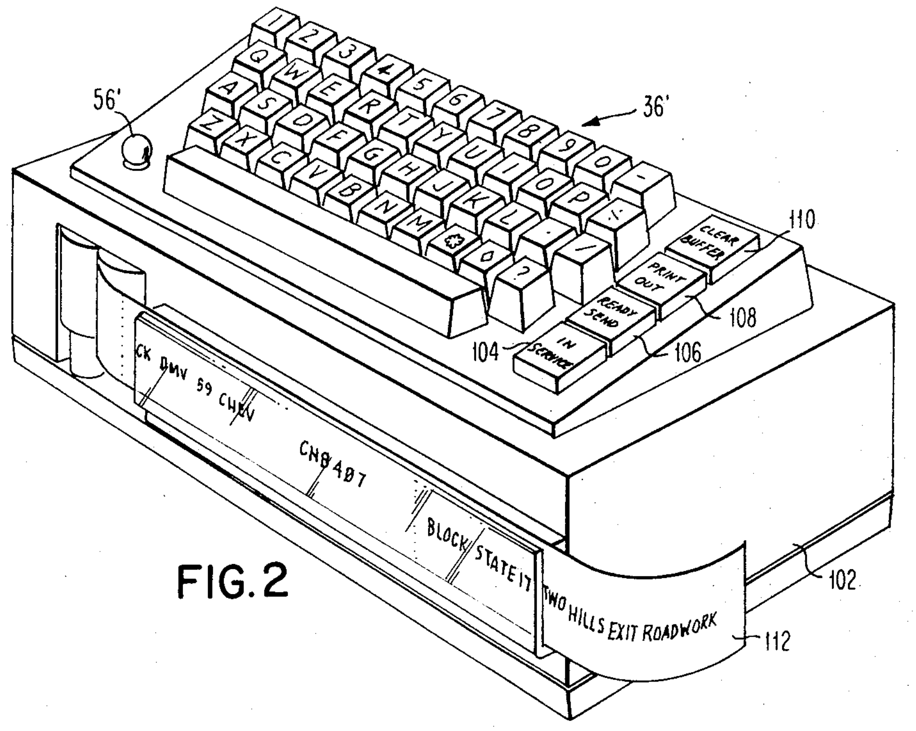
FIG. 2 illustrates printer, keyboard and central apparatus located at a circumjacent subordinate radio station in the system diagrammed in FIG. 1.

Alternative propagation evaluating arrangements are contemplated. The terminals 56 are connected to the printer 34 and/or the keyboard 36 and/or the control circuitry 40 for disabling the units under conditions of poor propagation. The terminals 54 are alternately connected for enabling also for a more positive control. Likewise two indicators such as a pair of lamps, are connected to both output terminals 54, 56 of the detector 52 for a more positive indication of the propagation possibilities. One of the indicators preferably is located in an operating console 102 shown in FIG. 2 for illuminating an "In Service" key top 104, for example, while the other lights as a warning lamp 56'.

The console 102 as shown, preferably is a compact unit incorporating the keyboard 36' and the printer, along with all of the necessary control keys 106, 108 and 110. Since there is no "computer" available in most cases, these keys operate the only variable elements in the message assembler at the satellite station. Preferably the printer records on a tape 112 which is retained for record purposes.

According to the invention, the components shown in FIG. 1 effect a message control system for effectively increasing the capacity for traffic flow as required by the user. In a system according to the invention the central radio station transmits messages addressed to subordinate stations in three categories:

a. Messages for selective delivery to a specific station; for example, to mobile station 126 only; or
b. A message for selective delivery to each of a predefined sub-group of mobile stations, for example, to each car of nine cars assigned to warehouse patrol; or
c. A message for the attention of all operational mobile stations.

There might be from perhaps 10 to 100 operational cars at any time.

Depending on the administrative strategy of the user, that a confirming response may or may not be required for each message. In a majority of cases such response will be required where a significant probability of non-delivery exists for any reason. The system thus allows communication defects to have minimum degrading effects on the overall administrative user system. The subordinate stations may or may not be desired to confirm receipt of a message when the vehicle is active but unattended. This arises from two differing bases:

a. The communications system has succeeded in delivering the subject message to the car addressed (a communications status);
b. The car is manned and therefore presumably in a position to actually respond to a request for action (an administrative status).

A communications system according to the invention is compatible with both of these bases, the determination of which is dependent on the plan of the administrative personnel.

In the mobile-to-central station communication, each mobile is able to initiate messages to the central station and share in the operation of the central receiver in a way assuring reasonable worst case delay and still makes effective use of the system. This coordination in avoiding congestion in the mobile-to-central station communication is of prime system importance.

Normally the central radio station is located at a very favorable vantage point so as to be in near line of sight with the mobile stations over the area of operation.

This does not mean that the mobile units are at all favorably sited for communication with each other. In the typical system where central-to-mobile station communication might be satisfactory over 98 percent of the operating area, mobile-to-central communications might be satisfactory over 90 percent of the area and mobile-to-mobile station communications might be satisfactory over less than 50 percent of the area. In fact, most systems are not equipped for mobile-to-mobile communications in that separate frequencies are often used for central-to-mobile and mobile-to-central communications as described hereinbefore. For these reasons mobile units usually are not able to hear other mobile units directly. When mobile-to-mobile unit direct communication is deemed necessary or even desirable, it is usually accomplished with voice communication on other frequencies. Separate receivers are used but normally a single transmitter is shared; the carrier oscillator crystals only need be switched in such installations. In such cases it is usually desired that the central station be able to monitor the transmissions between mobile units. To this end, the control of the mobile transmitter according to the invention is effected for all frequencies, though the control is based on the data transmitting channel evaluation.

Traffic is controlled efficiently in both directions by the central station. The traffic flow in the two directions is essentially independent but interactive in the sense that a message is transmitted in one direction and confirmed by transmission in the opposite direction.

Figure 3:
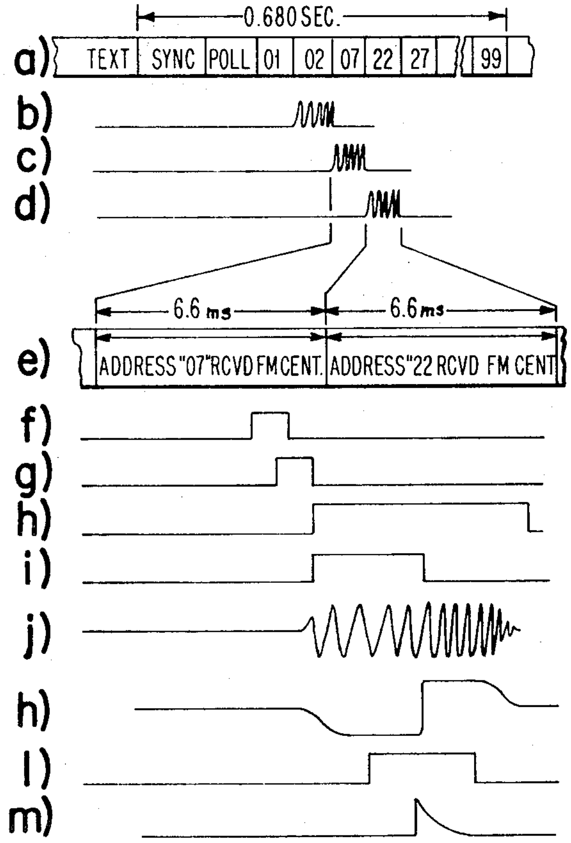
FIG. 3 is a diagram of message format and waveforms relating to accelerated polling.

A preamble of synchronizing information is provided in each transmission from the central station. FIG. 3(*a*) shows a typical time allotment for a message with such a preamble. The loss in time due to this preamble which usually consists of a very short interval for baudel or bit element synchronization followed by a character synchronization pattern is dependent on how frequently synchronization need be re-established. The loss may be very high with frequent short messages on new contacts, but the central station transmitter 20 operates continuously. When there is no message data, synchronizing characters alone make up the data train. Periodic polling may also take place as the administrative requirements may dictate. This minimizes any need to re-establish synchronization to the resumption after a propagation failure or after a loss of signal from the central station due to any operation of the local mobile station transmitter 44 which blocks the companion receiver 30. The latter failure is prevented by the arrangement like that above described in which a mobile unit with traffic is locked out on transmit if at the moment the mobile receiver is taking traffic for that mobile. When a receiver in a mobile unit resumes under these conditions, continuous but isochronous data appears from the central station transmitter until the receiver 30 pulls into complete synchronization or the next synchronizing character. This is then in time for the first message of use in any event.

Some of the synchronous function requiring the preamble is transferred to the data stream moving in the other direction. The character format structure is radiated by the central station transmitter in some cases. If messages of only a small information content are required in reply they are coded in reference to this format structure. A prime example of the usefulness of this approach lies in confirmation required from each of many mobile units to a broadcast general call. Upon termination of broadcast message, the stage is set for the worst case pile-up as all mobile units then actively contend for attention to their acknowledgment.

Polling has traditionally been considered inefficient because each mobile unit has had to come up, establish bit and character synchronization and then transmit its confirmation in turn.

The circuit arrangement for determining the status of communications with respect to pile-up and the interconnections according to the invention comprise a practical first-order contention scheme with automatic polling recovery from pile-up which is both reliable and efficient. According to the invention an automatic poll of sequential addresses of active cars broadcast by central is taken at the conclusion of any message requiring confirmation. This requires but one character per car, which takes one one hundred fiftieth second at 1,200 baud or 6.6 milliseconds/car for eight-bit characters (seven bits of binary identity plus one bit of mobile traffic control described hereinafter).

FIG. 3(*a*) illustrates a time slot allocation for a typical data train. The slots following the "Poll" slot are mobile radio station addresses. Radio frequency address bursts for mobile stations 02, 07, and 22 are represented by the curves 121, 122, 123 of FIGS. 3(*b*), 3(*c*) and 3(*d*). FIG. 3(*e*) is a time-dimension expanded version of the time slots for mobile stations 07 and 22 only. The curve 124 of FIG. 3(*f*) represents the address recognition pulse derived at the address detector 90 of the mobile station 07, while the curve 125 (FIG. 3(*g*) represents the corresponding pulse at the output of the delay circuit 94. The control circuitry 40 at the subordinate station comprises conventional circuitry for gating that is capable of developing a transmit control pulse wave 126 shown in FIG. 3(*h*) and a modulation control pulse 127 represented in FIG. 3(*i*) for radiating a response wave 128 shown in FIG. 3(*j*). Note that the latter three waves are active in the time slot for the next addressed mobile station. In practice these waves may be delayed for a small multiple of time slots if desired. At the central station receiver 50 the discriminator output appears typically as represented by the curve 129 in FIG. 3(*k*). A recognition gate 130 shown in FIG. 3(*l*) is generated by conventional circuitry in the message control circuitry assisted by the CPU 10 as programmed to gate an expected confirmation pulse 131 as represented by FIG. 3(*m*). The latter is differentiated from the wave 129.

Figure 4:
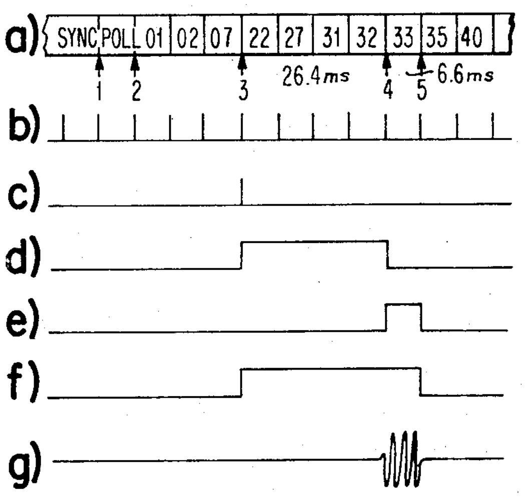
FIG. 4 is a like diagram of response to polling by the circumjacent subordinate radio station.

FIG. 4 is schematic representation of the receiver operation for mobile station 07 with greater delay time from the delay circuit 94. FIG. 4(*a*) is again a polling sequence. FIG. 4(*b*) represents the derived character clock train 141 of the output of the counting circuit 76. FIGS. 4(*c*) to (*g*) correspond to FIGS. 3(*f*) to (*j*).

A method of control of the mobile-to-central station traffic is provided. This is accomplished in part by the transmission by the central station of status indicator. A periodic bit in the central station message data stream is dedicated to the indication of the mobile-to-central communication status. This status is derived from information obtained from the central station receiver 50. This periodic bit preferably is one bit per character (once every 6.6 milliseconds). Alternately fewer bits in sub-multiples of this rate will suffice but additional circuitry is required. An attractive approach contemplated is to expand the indication to several bits sent alternatively (as part of odd and even central characters in the case of two bits, for example). This ability is another advantage derived from the initial system feature of continuous central station transmission.

As a consequence of the operation of multiple mobile units as described, there is a finite possibility of two or more cars contending for the central station receiver in the singular time relation which prevents any from being successful in transmission to the central station. In other words, the disclosed system is generally efficient and has a remote possibility of pile-up. As this event is serious, it remains to show an automatic way in which the system recovers from such a pile-up should one occur.

According to the invention, a pile-up (being called by two or more cars) is recognized by signal analysis circuitry in the central station receiver 50. This circuitry is arranged to detect the difference in data structure between a single incoming signal (including one of marginal quality) and multiple signals. The desired differentiation is made in part by reference to the second limiter current of the central station receiver 50. This qualitative measure of received signal amplitude is used to separate the reception of a signal of such strength that if it is a single car it should produce low data distortion output from the reception of a signal of such low strength that even if it is a single car (no other interference) it will probably produce a data output with considerable distortion.

The second part of the differentiation is made by reference to the telegraphic distortion in the data produced by the demodulator at the central station receiver 50. This measure of data distortion is evaluated as being high or low with respect to a predetermined threshold in order to separate a signal with distortion so low that correct data recovery is assured from a signal with distortion so high that correct data recovery is unlikely.

The detection characteristics of frequency modulation (FM) detectors are well known to be amplitude controlled in a threshold manner. This is the "capture effect" in FM in which the post detection signal to noise ratio is improved over the predetection signal to noise ratio for signals exceeding a given value. Conversely, the post detection signal to noise ratio is degraded compared to the detector input signal to noise ratio for input signal strengths less than this threshold value. This known characteristic of FM detection is applied in evaluating the signal strength for rendering the quality distinction quite clearcut.

The R.M.S. value of the telegraphic distortion in the demodulator data output is readily evaluated by known means for evaluating distortion.

The status of the central station operation is now deducible by a comparison made clear in the table below.

CHANNEL STATUS ANALYSIS

0——Antenna signal strength——Maximum

Busy level — Single level

| | | | |
|---|---|---|---|
| 0% | Noise only range | Marginal weak signals | Typical strong signals (heavy limiting) |
| | | | Strong signals producing good data at low distoration. |
| | This condition does not occur. | | Correct normal reception. |
| Distortion | | (Indicates mobile-to-central busy). | |
| | No station calling | Marginal reception | Strong signals producing distorted output. |
| | Indicates mobile-to-central idle. | Indicates mobile-to-central busy. | Multiple mobiles indicated (mobile pile-up). |
| 50% | Central radiates flag bit inviting mobile traffic. | Cannot be due to normal mobile pile-up. | Initiate polling to identify calling stations. |

Busy level — Single level

The parameter of received signal strength is evaluated against two threshold levels represented by vertical lines as shown. The lower of these thresholds is the "busy" threshold. This is somewhat higher than the background noise will exceed except on rare occasions. It is low of the strength required to produce recoverable output and is about typical in voice operation of a "squelch" setting which is occasionally opening on noise and frequently opening on signals so weak as to be highly distorted.

The higher threshold on signal strength is the minimum "single" signal level for low distortion. This is the level exceeded by a normal car transmission and is one in which the first limiter stage of the receiver 50 is in limiting and one in which the output signal-to-noise ratio will not be significantly improved for further increase in input level.

There is one distortion threshold level represented by the horizontal line across the center of the table. This level is set at a value about typical of that produced by a single normal transmission of strength such to be about at the point of first limiter operation (that is just well above the knee in the detection characteristic).

None of the above level threshold settings are at all critical nor do they require adjustment during operation. The range of the variables is normally large and the decision areas are quite clear cut.

When the status of the mobile channel is that of strong signals and high distortion (lower right sector) there is a high probability that a pile-up has occurred in second order contention in which the mobile units are contending for the attention of the central station receiver 50 under the control of the busy-idle flag radiated to all mobiles by the central station transmitter 20.

When contention, or pile-up, is indicated, the central station is arranged to halt further contention by changing the control bit from "idle" to "busy" and poll all active mobile units; this is asking by implication "do you have traffic?"

In the assigned response time slot, each mobile unit having traffic responds in the same way as described hereinbefore with respect to the confirmation of messages.

It is of practical importance to note that polling according to the invention accomplishes a response from each of a large number of cars in a very short period of time. This is generally impossible under other earlier approaches which required the mobiles to come up into bit and character synchronization for each transmission.

A serious prior art limitation is a delay of tens of milliseconds in turn-on and turn-off time of conventional mobile units. This would slow the polling procedure to an unacceptable degree. This delay is obviated according to the invention by having each mobile unit reply in a character slot delayed sufficiently from the receipt of that car's address that there is adequate time for effecting the receive-to-transmit changeover. The use of an additional conventional R.F. gating control on the transmitter enables the actual radiated burst to be easily confined to the 3 to 5 milliseconds desired.

While the invention has been shown and described particularly with reference to a preferred embodiment thereof, and various alternatives have been suggested, it should be understood that those skilled in the art may effect still further changes without departing from the spirit and the scope of the invention as defined hereinafter.

The invention claimed is:

1. An exigent multiple circumjacent station synchronous digital radio communication system comprising,
   - a central radio station having
     - data handling circuitry for translating trains of digital data characters with all characters comprising a predetermined number of bits,
     - a bit rate oscillating circuit coupled to said data handling circuitry for timing said digital data trains,
     - transmitting apparatus coupled to said data handling circuitry and tuned for continuously radiating a digital data modulated radio wave at a given carrier frequency, and
     - receiving apparatus coupled to said data handling circuitry and tuned to receive a digital data modulated radio wave at a different carrier frequency,
   - at least one subordinate radio station having
     - receiving apparatus tuned to receive said digital data modulated radio wave of given carrier frequency,
     - transmitting apparatus arranged for transmission of digital data modulated radio waves at said different carrier frequency,
     - circuitry coupling said receiving apparatus to said transmitting apparatus for timing the digital data transmitted thereby, a shift register coupled to said receiving apparatus for translating said predetermined number of digital data bits at the bit rate of said oscillating circuit at said central station, a character counting circuit coupled to said receiving apparatus for counting said predetermined number and having reset and output terminals, a synchronizing character detecting circuit coupled to said shift register and having output terminals connected to said reset terminals of said counting circuit for resetting the same on said shift register containing said synchronizing character, and thereby maintaining said subordinate station in bit and character synchronization with said central station.

2. An exigent multiple circumjacent station synchronous digital radio communications system as defined in claim 1 and incorporating a further counting circuit having input terminals connected to said output terminals of said character counting circuit and having reset terminals, an operational character detecting circuit coupled to said shift register and having output terminals connected to said reset terminals of said further counting circuit for resetting the latter on said shift register containing said operational character, and thereby synchronizing said subordinate station in readiness for performing an operation, in accordance with said operational character.

3. An exigent multiple circumjacent station synchronous digital radio communications system as defined in claim 2 and wherein said further counting circuit has output terminals at each of at least a plurality of component stages, and incorporating a qualifying character detecting circuit having terminals connected to said output terminals of said further counting circuit and having output terminals, and circuitry connected to said output terminals of said qualifying character detecting circuit and interconnected with other of said apparatus for rendering the same operational only on said qualifying character being represented in said further counting circuit.

4. An exigent multiple circumjacent station synchronous digital radio communications system as defined in claim 3 and incorporating further circuitry interposed between said qualifying character detecting circuitry and said apparatus and having a connection to a predetermined stage of said further counting circuit for rendering said apparatus operational in response to detection of said qualifying character and responsive to the count in said further counting circuit reaching said predetermined stage.

5. An exigent multiple circumjacent station synchronous digital radio communications system as defined in claim 4 and incorporating a delay circuit arrangement coupled to said qualifying character detecting circuit and to said further counting circuit for delaying the response to said count by a predetermined number of counts.

6. An exigent multiple circumjacent station synchronous digital radiocommunications system as defined in claim 5 and wherein said delay circuit arrangement is connected to said further counting circuit at a stage later in said count by said predetermined number of counts.

7. An exigent multiple circumjacent station synchronous digital radio communications system as defined in claim 6 and incorporating response circuitry coupled to said transmitting apparatus and to said further circuitry and arranged for transmitting a burst of radio frequency energy in response to receipt of said qualifying character.

8. An exigent multiple circumjacent station synchronous digital radio communications system as defined in claim 7 and incorporating gating circuitry interposed in said response circuitry and arranged for limiting said burst to a time duration within one of said counts.

9. An exigent multiple circumjacent station synchronous digital radio communications system as defined in claim 8 and incorporating propagation evaluating circuitry connected between said gating circuitry and said receiving apparatus and arranged for gating said burst in response to evaluation of radio wave energy between said central station and said subordinate station.

10. An exigent multiple circumjacent station synchronous digital radio communications system as defined in claim 1 and incorporating message controlling circuitry at said central station connected to said receiving apparatus and to said data handling circuitry for interposing prearranged data in said data train in response to reception of data by said receiving apparatus, and prearranged data recognition circuitry at said station connected to said receiving apparatus and to said transmitting apparatus and arranged for preventing transmission in response to reception of said prearranged data.

11. An exigent multiple circumjacent station synchronous digital radio communications system as defined in claim 10 and wherein said prearranged data recognition circuitry is connected to said shift register.

12. An exigent multiple circumjacent station synchronous digital radio communication system as defined in claim 1, and wherein said coupling circuitry comprises a digital data transition detecting circuit.

13. An exigent multiple circumjacent station synchronous radio communication system comprising, a central radio station having data handling circuitry, transmitting apparatus coupled to said data handling circuitry for continuously radiating a radio wave at a given carrier frequency and receiving apparatus tuned to receive a modulated radio wave at a different carrier frequency, and a plurality of subordinate radio stations each subordinate radio station having receiving apparatus tuned to receive said modulated radio wave of given carrier frequency, transmitting apparatus arranged for transmission of radio waves at said different carrier frequency, a detector coupled to the receiving apparatus of the subordinate station under consideration for measuring the quality of radio wave propagation between said central station and said subordinate station under consideration, an indicator coupled to said detector for indicating the quality to an observer, and circuitry connecting said detector to said transmitting apparatus for confining transmission thereby to conditions of favorable propagation only, thereby eliminating interference with subordinate station to central station communication by subordinate stations under unfavorable propagation conditions.

14. An exigent multiple circumjacent station synchronous radio communications system as defined in claim 13 and wherein said circuitry interconnecting said detector and said transmitting apparatus is arranged to lockout said transmitting apparatus under conditions of unfavorable propagation.

15. An exigent multiple circumjacent station synchronous radio communications system as defined in claim 13 and wherein said circuitry interconnecting said detector and said transmitting apparatus is arranged to enable said transmitting apparatus under conditions of good propagation.

16. An exigent multiple circumjacent station synchronous radio communications system as defined in claim 13 and wherein said detector is a level triggering reciproconductive circuit.

17. An exigent multiple circumjacent station synchronous radio communications system as defined in claim 13 and wherein said detector has a hysteresis characteristic thereby eliminating marginal operation under conditions of marginal propagation.

18. Circuitry for controlling the operation of a subordinate two-way communications radio station from a like central radio station having means for transmitting messages including a predetermined message start signal and a predetermined index character signal transmitted periodically when said central station is idle with respect to traffic therefrom, comprising demodulated data input terminals at the output of a radio receiver at a subordinate radio station, a data bit clocking circuit coupled to said input terminals, a shift register coupled to said input terminals and shifted by said bit clocking circuit for examining the demodulated data one character length at a time, start and identification character recognition circuitry coupled to said shift register for delivering character clocking and polling initiating pulses, character clocking and polling controlling circuitry responsive to data passing through said shift register, and station identification circuitry coupled to said polling central circuitry for effecting operation of said subordinate radio station.

19. Circuitry for controlling the operation and response of a subordinate two-way communication radio station from a central two-way communication radio station having means for periodically transmitting messages having a message start signal and a predetermined index character when said central station is idle with respect to traffic transmitted therefrom, comprising, demodulated data input terminals at the output of the radio receiver at a subordinate station, a receiver bit clocking circuit having input terminals connected to said data input terminals and output terminals, a shift register having input terminals connected to said bit clocking circuit output terminals, data output terminals and stage output terminals, a character divider circuit having input terminals coupled to said bit clocking circuit ouput terminals, character clocking circuit output terminals and reset pulse input terminals, a further divider circuit having input terminals coupled to said character clocking output terminals, stage output terminals, and reset input terminals, a start character recognition circuit having stage input terminals coupled to said stage output terminals connected to said character divider reset terminals, and stage output terminals, an index character recognition circuit having stage input terminals individually coupled to said stage output terminals of said start character recognition circuit and output terminals coupled to said reset terminals of said further divider circuit, a subordinate station identification circuit individual to said subordinate station; and a comparing circuit having input terminals coupled to said further dividing circuit stages, input terminals coupled to said identification circuit and output terminals at which a signal is developed for effecting the operation of said subordinate radio station to said central radio station on recognition of the identification of said subordiante station.

* * * * *